Oct. 31, 1961   J. A. HARRIS   3,006,554
SPRINKLER CONTROL SYSTEM
Filed Oct. 1, 1959   5 Sheets-Sheet 1
FIG_1
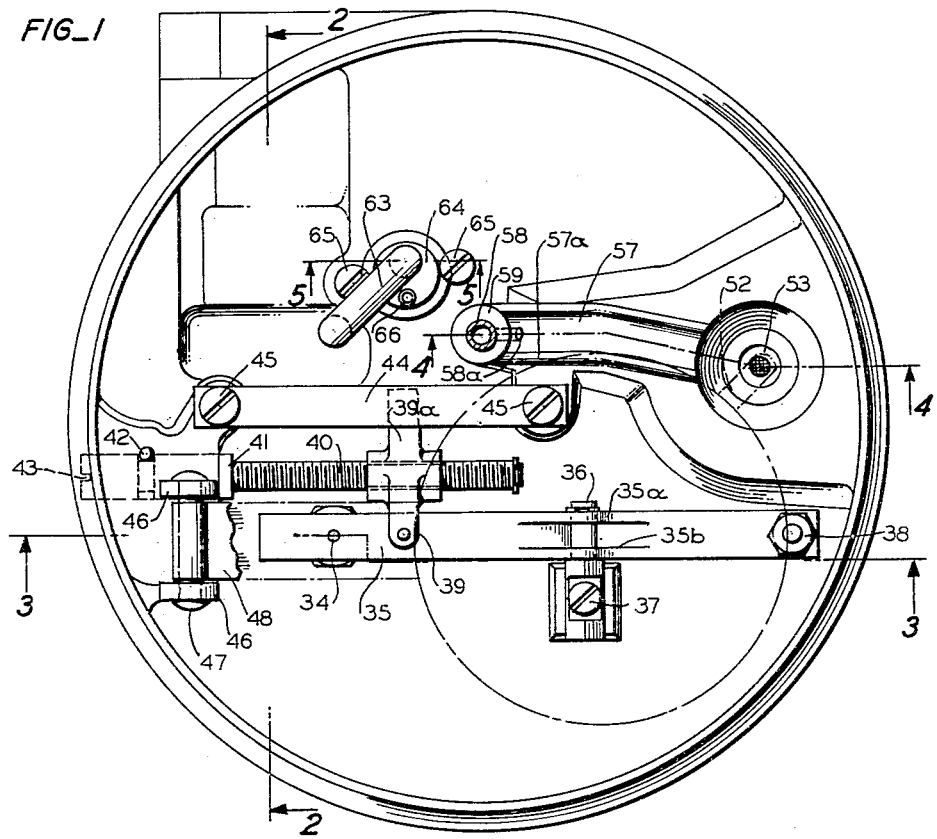
FIG_2
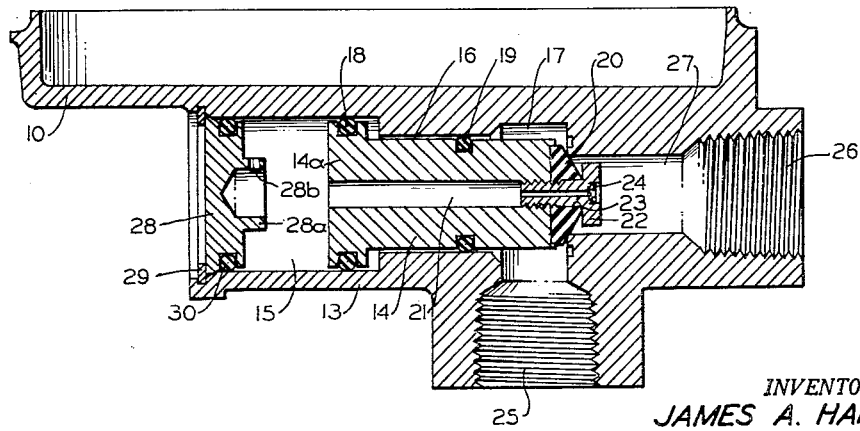
INVENTOR.
JAMES A. HARRIS
BY
Allen and Chromy
ATTORNEYS Oct. 31, 1961  J. A. HARRIS  3,006,554
SPRINKLER CONTROL SYSTEM
Filed Oct. 1, 1959  5 Sheets-Sheet 2
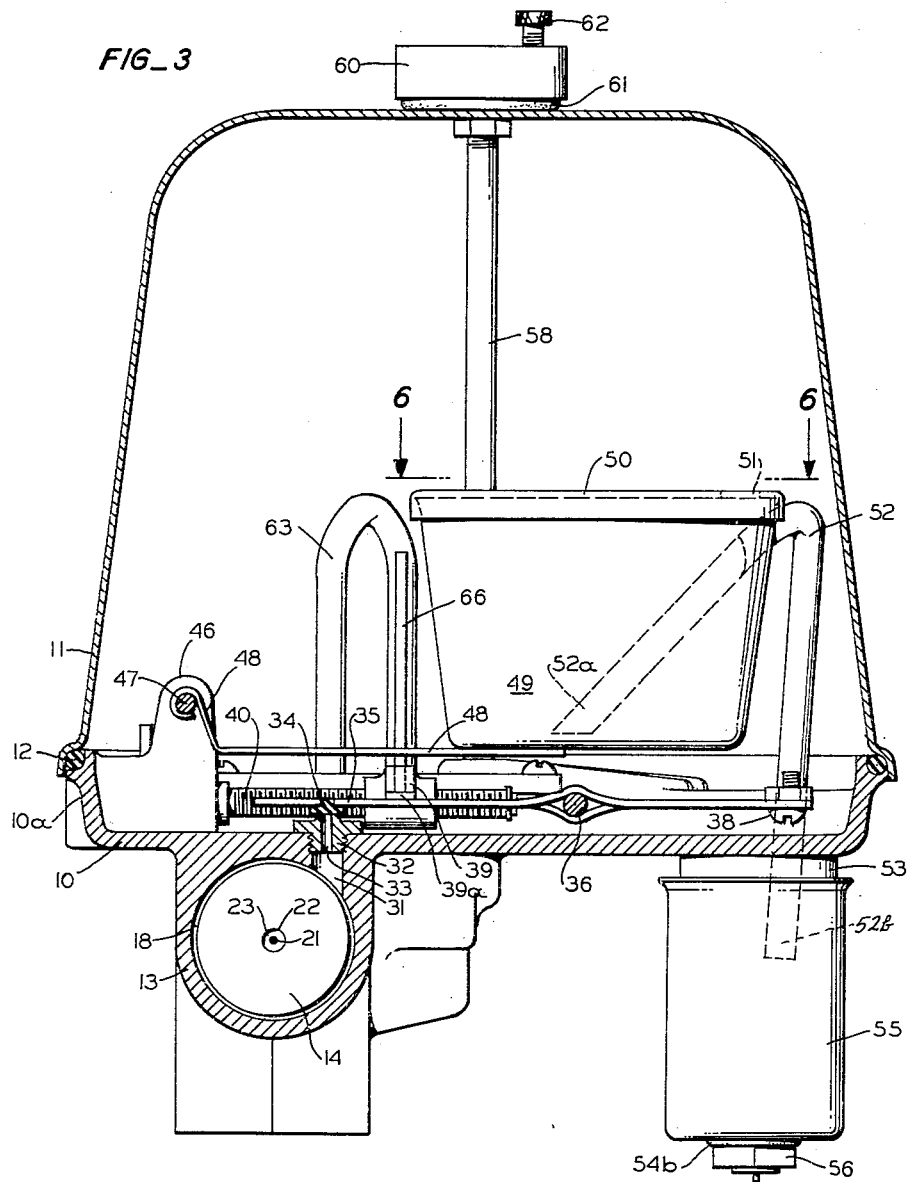
FIG_3
INVENTOR.
JAMES A. HARRIS
BY
ATTORNEYS

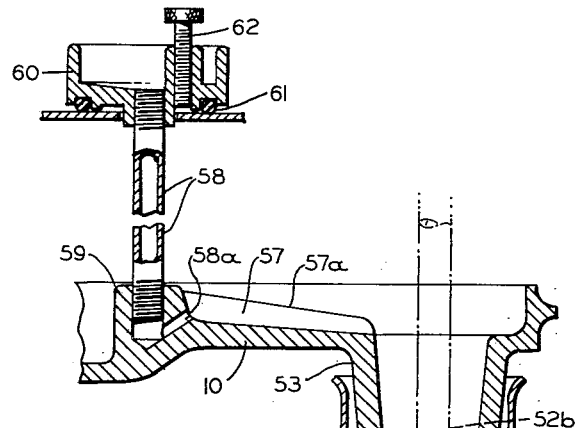
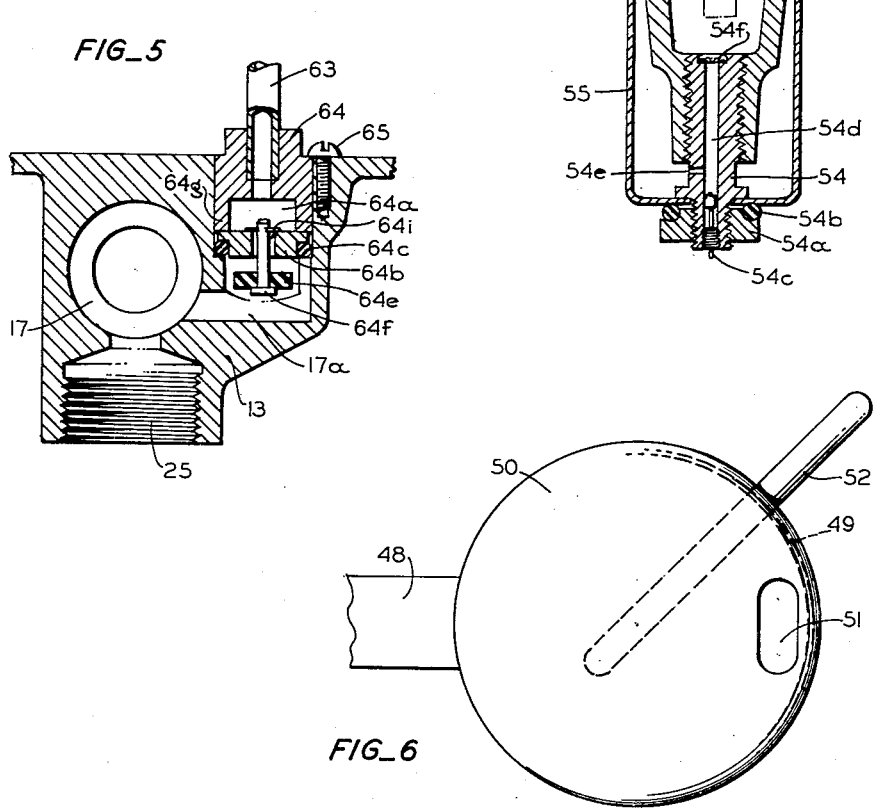

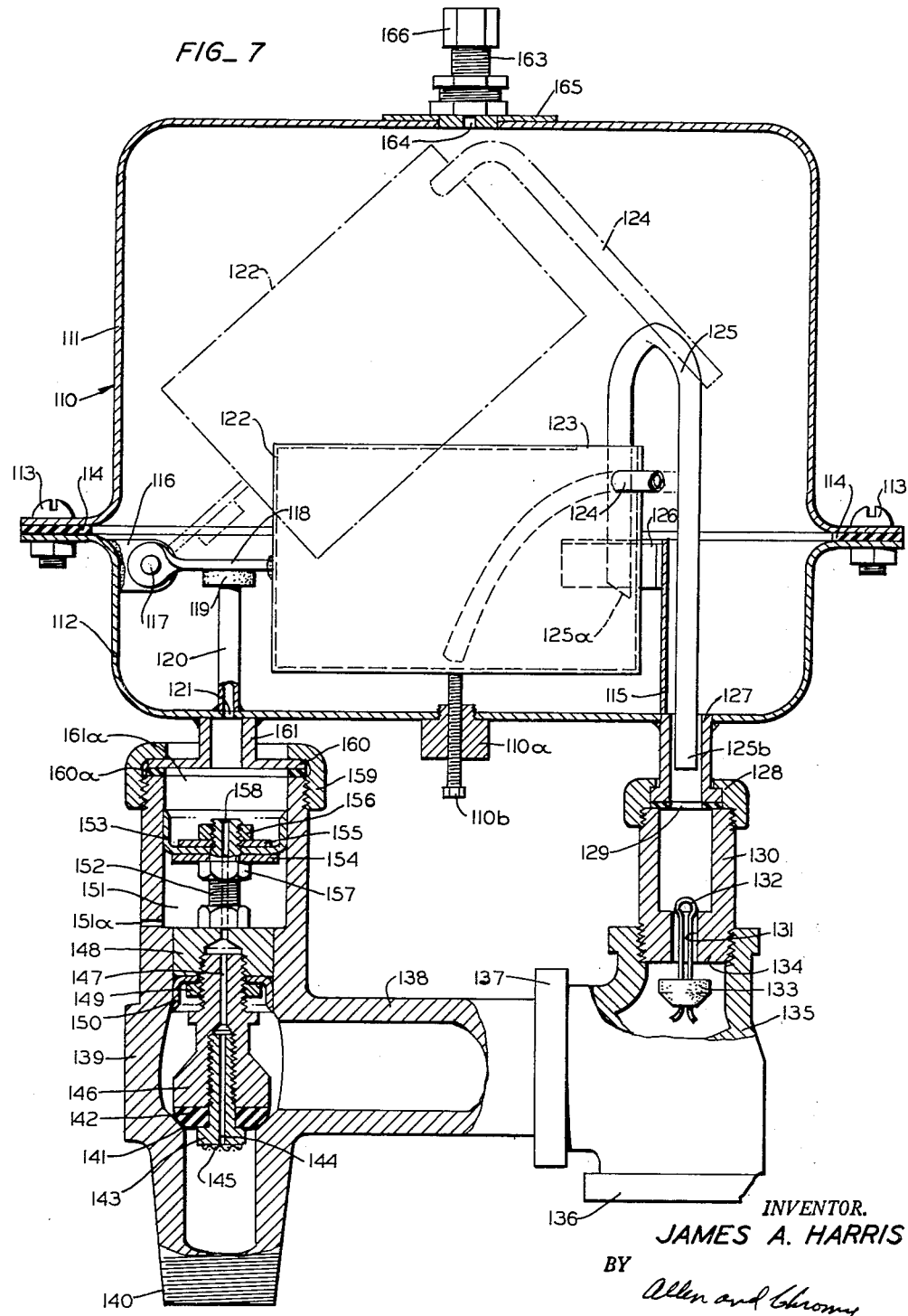

Oct. 31, 1961    J. A. HARRIS    3,006,554
SPRINKLER CONTROL SYSTEM
Filed Oct. 1, 1959
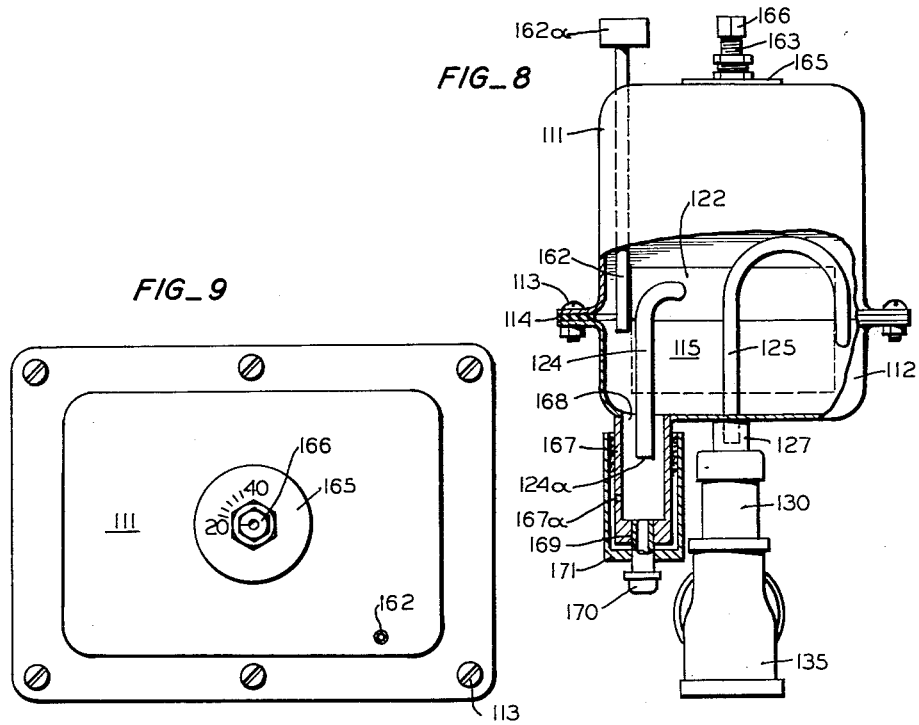
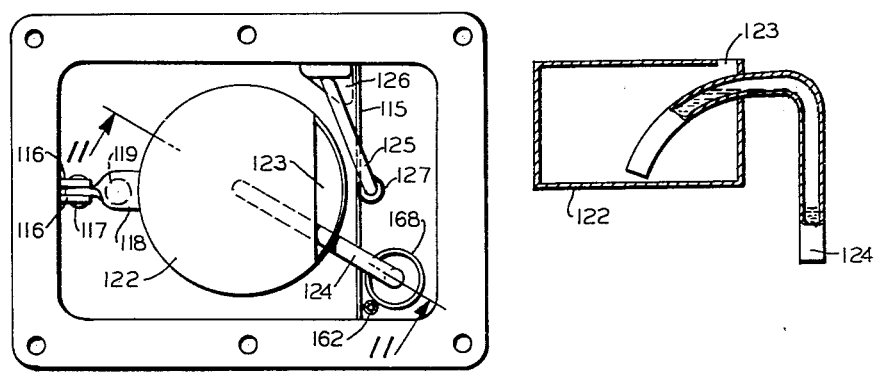
INVENTOR.
JAMES A. HARRIS
BY
Allen and Chromy
ATTORNEYS United States Patent Office 3,006,554
Patented Oct. 31, 1961

3,006,554
SPRINKLER CONTROL SYSTEM
James A. Harris, 61 Gregory Place, Oakland 19, Calif.
Filed Oct. 1, 1959, Ser. No. 843,859
12 Claims. (Cl. 239—67)

The present invention relates to control systems for lawn sprinklers and the like, and is concerned more particularly with an improved structure to give efficient control of the frequency of operation of the sprinkling system, to control the length or duration of the watering by the sprinkling system and provide suitable interlocks between various sprinkler systems simultaneously under control so that more than one will not be in operation if the pressure is too low.

This application is a continuation-in-part of my application, Serial No. 729,211 filed April 17, 1958 which is a continuation in part of my application S.N. 457,845 filed September 23, 1954, now abandoned.

In the control of sprinkling systems, it is desirable to have such sprinkling systems automatically in operation, and responsive to the weather conditions in controlling the interval between waterings, so that watering will not occur after rainfall or other moisture from the air has aided in keeping the lawn moist. It is also desirable to provide for an interlocking system where a plurality of sprinkler systems are connected to the same water circuit so that only one will be in operation at the same time. In such sprinkling systems, it is also desirable to have the main sprinkler valve controlled by a smaller control or pilot valve to avoid expensive construction of the main valve and to enable economical manufacture.

The above and other objects of the invention are attained as described in connection with certain preferred embodiments of the invention, as illustrated in the accompanying drawings, in which:

FIGURE 1 is a plan view of the base of the tank and shows various elements positioned on said base;

FIGURE 2 is a sectional view taken along the line 2—2 of FIGURE 1;

FIGURE 3 is a vertical sectional view of this device and this view shows a sectional view of the base illustrated in FIGURE 1 taken along the line 3—3 of FIGURE 1.

FIGURE 4 is a sectional view taken along the line 4—4 of FIG. 1 also showing the rain receiving cup in section;

FIGURE 5 is a sectional view taken along the line 5—5 of FIG. 1;

FIGURE 6 is a plan view of the float closure and syphon tube of the float;

FIGURE 7 is a vertical sectional view of another embodiment of this invention;

FIGURE 8 is a view in side elevation partially in section of the device shown in FIGURE 7;

FIGURE 9 is a plan view of the device shown in FIGURE 7;

FIGURE 10 is a plan view of the bottom tank section and elements positioned therein; and FIGURE 11 is a sectional view taken along the line 11—11 of FIGURE 10.

Referring to FIGURES 1–6 of the drawing in detail, there is shown an embodiment of this sprinkler control employing a base 10 which is provided with an upstanding flange 10a around the circumference thereof and this flange has a groove formed therein for receiving the gasket 12. An inverted cup-shaped cover 11 is positioned over the base 10 to form a tank structure and the lip of this inverted cup-shaped cover is adapted to be brought into sealing engagement with the gasket 12 to provide a fluid tight seal therewith. The base 10 has formed integral therewith a valve housing 13 which is provided with a longitudinally extending cavity in which the slidable valve member 14 is positioned.

This cavity is divided into several sections, each of which has a different diameter. Thus the section 15 is of a diameter commensurate with the diameter of the large end 14a of the valve member 14 and this large end 14a is provided with a groove in which the O ring 18 is positioned so as to make a fluid tight seal between the portion 14a and the walls of the section 15. The cavity section 16 which is connected to the section 15 is of reduced diameter that is commensurate with that of the main body portion of the valve member 14. This main body portion is provided with a groove for receiving the O-ring 19 which makes a fluid tight seal between it and the walls of the cavity portion 16. The cavity portion 17 is of a larger diameter than the cavity portion 16 and provides a space around the body portion of the valve member 14, which space opens into the threaded outlet opening 25. This threaded outlet opening is adapted to be joined to suitable pipes that connect to the sprinkler system.

A holes 21 extends longitudinally through the main valve member 14 and this hole is threaded at one end thereof to receive the member 22 which has a substantially smaller hole 23 extending longitudinally thereto connecting with the hole 21. Thus the hole 23 connects the cavity portion 27 to the hole 21 which opens into the cavity portion 15 and a suitable screen 24 is provided to the member 22 to prevent foreign objects from entering and clogging the small hole 23. The member 22 functions to hold the seal 20, which is of suitable resilient material such as nylon, rubber and the like, in position on the corresponding end of the valve member 14 and this seal is supported on the member 14 so as to provide sealing engagement with the housing 13 thereby to close the inlet cavity 27 from the cavity portion 17. The inlet cavity 27 opens into the threaded inlet 26 which is connected by suitable piping to the water supply. The cavity portion 15 is closed by the cover 28 which is provided with a groove for receiving the gasket 30 which makes a seal between this cover and the inner wall of the cavity 15. This cover is held in place by the expandable retaining ring 29 which is lodged in a suitable groove formed in the wall of the housing 13. A circular projection 28a extends from the inner surface of the cover 28 and this projection functions as a stop to limit the motion of the valve member 14, that is, when this member 14 is moved to the left to open the cavity portion 17 to the inlet cavity. At this time the cavity encircled by the projection 28a is connected to the cavity 15 through the port 28b.

A hole 31 shown in FIGURE 3 is provided through the base 10 opening into the valve housing 13 adjacent to the inner end of the cover 28 and the member 32 is threaded into this hole from the top end thereof. This member 32 is provided with a longitudinal hole 33 connecting with the hole 31. The top end of the member 32 is provided with a slight upstanding flange surrounding the opening into the hole 33. The sealing member 34 which is attached to the pivoted member 35 near one end thereof engages this flange and forms a seal therewith for the top end of the hole 33. The member 35 is provided with an aperture for frictionally receiving a portion of the sealing member 34 so that this sealing member is supported on this member.

The member 35 is pivotally supported on the base 10 by means of a pivot member 36 which is attached to the base by the screw 37 as shown in FIGURE 1. The mid-portion of the member 35 is provided with two slits 35a and 35b so that the outer parallel sections of this member may be bent out of the plane thereof in one direction and the central part of this member between the slits may be bent in the opposite direction whereby the pivot 36 may be inserted in between these deformed sections. The other end of the member 35 is provided with a weight 38, which may be in the form of a screw or other suitable weight, and normally this weight tends to lift the sealing member 34 away from the top end of the member 32. However, the adjustable stop 39 is provided with a slidable insert 39a, the enlarged bottom of which engages the member 35 for limiting the upward motion of the left-hand portion of the member 35. The upper end of the slidable insert 39a engages the float pivoting member 48 when the float 49 is in its down position as will be described hereinafter. The adjustable stop 39 is provided with a threaded hole for receiving the threaded portion of the rod 40. The unthreaded portion 41 of the rod 40 is made of slightly larger diameter and this portion is positioned in a suitable hole formed in the base 10 so that the end of this rod is accessible from the exterior of said base. The portion 41 of this rod is provided with a groove for receiving the pin 42 which is supported in the base 10 and which limits the longitudinal movement of said rod. The outer end of the rod 40 is provided with a slot 43 for receiving a screwdriver whereby the rod may be rotated from the outside of the tank base and the position of the stop 39 may thereby be adjusted. The stop 39 is also provided with an extension which extends under the bar 44 that is supported in a raised position over base 10 on suitable projections and is attached to the tops of these projections by means of the screws 45. This extension is adapted to move between the bar 44 and the base 10 as the member 39 is moved along the rod 40 and said extension prevents rotative motion of the member 39.

A pair of spaced projections 46 is formed on the upper or inner side of the base 10 and the upper portions of these projections are provided with suitable holes for receiving the pin 47 which acts as a pivot for the member 48. One end portion of the member 48 is looped around the pivot pin 47 and the other end portion is attached to the float 49 by soldering, brazing or the like. A suitable cap 50 which is of plastic or other suitable material is provided with a flange for frictionally engaging the open top of the float 49 to close said top except for a small hole 51 formed in this plastic cover. The float 49 is also provided with a syphon tube 52 which is positioned in a hole formed in the upper part of this float and this tube is soldered or brazed in said hole. The open end 52a on this tube extends into the float almost to the bottom while the open end 52b thereof extends down into a well 53 that is provided in the base 10, as shown in FIG. 4. The well 53 extends below the base 10 into the evaporation cup 55 which is supported on the bottom thereof by the fitting 54, which is threaded into the bottom of the well 53, and the nut 54a threaded to the bottom portion of this fitting. A hole 54d extends longitudinally through this fitting and the upper end of this hole opens into the well 53 through the screen 54f. A small hole 54e is provided in the fitting 54 just above the valve 54c to connect the hole 54d to the cavity in the evaporation cup 55. The valve 54c is of the type such as used in automobile tires and this valve may be opened by pressing up on the stem thereof which projects from the bottom of the fitting, so that the water in well 53 may be drained out if desired.

A channel 57 formed between two ridges 57a is provided in the base 10 and this channel is tilted to empty into the well 53. A tube 58 is threaded into the projection 59 provided to the base 10 at the upper end of the channel 57 and water collected in the cup 60 attached to the top of the tube 58 above the cover 11 is drained through this tube and through the hole 58a formed through the projection 59 into the channel 57. Thus rain water from the cup 60 is drained through the tube 58 and the hole 58a into the channel 57 and into the well 53 and evaporation cup 55.

The bottom of the cup 60 is provided with a groove for receiving the gasket 61 to provide a seal between the bottom of this cup and the top of the cover 11. The cup 60 threaded to the upper end of the tube 58 also functions to hold the cover 11 in sealing engagement with the gasket 12 that is positioned on the flange 10a.

The U-shaped tube 63 is fastened to the plug member 64 which is held in position in a hole formed in the base 10 by the screws 65 which are threaded into the base. The inner end of the plug 64 is provided with a flange 64g which engages the peripheral portions of the disk-shaped member 64b and presses these portions against the O-ring 64c. The disk 64b is provided with a central hole 64i in which the rod 64f is loosely supported so that this rod does not close the hole. This rod fits loosely into the hole 64i so that when the rod and sealing member 64e are in the lower position as shown, the cavity 64a is open to the cavity 17a through the hole 64i and the cavity 17a is connected to the cavity 17, which in turn is connected to the outlet 25. The other end of the U-shaped tubular member 63 extends down toward the base 10 into a small well and clearance is provided between the open end of the tubular member 63 and said base. Another tubular member 66 which may be of plastic such as nylon is positioned in another hole in the member 64 and extends up toward the bend in the U-shaped member 63. The upper end of the tubular member 66 is open and the purpose of this open tube is to prevent syphoning of the water out of the tank structure during the filling thereof.

It will be noted that the position of the member 39 may be adjusted by rotating the threaded member 40 so that the pressure applied to the top of the insert 39a may be controlled over a predetermined range. This adjustment may be accomplished from the outside of the tank structure by inserting a screwdriver into the slot 43 of the rod 41.

The operation of the embodiment of this invention shown in FIGURES 1–6 is as follows: When the float 49 is in its lower position, as shown in FIGURE 3, and when this float is full of water the main valve member 14 is in its closed position, as shown in FIGURE 2, that is sealing member 20 thereof is seated against the lip of the cavity 27 and water is prevented from flowing from the inlet cavity 27 to the outlet 25. At this time air is trapped in the U-shaped syphon tube 52 and an air-bubble is formed in this syphon tube extending well down toward the end portion 52b, as shown in the modification of the float 122 illustrated in FIGURE 11 which is provided with a syphon tube 124. The water level in the end portion 52b of the tube 52 is determined by the water level in the well 53 and the two levels are substantially coincident. When the water is drained from the well 53 to the extent that the end 52b of the tube 52 is above this water level, then the syphon tube 52 functions to empty the water from the float 49. This results when the water level in the evaporation cup 55 is lowered sufficiently because of evaporation therefrom. When the water from the float 49 is syphoned therefrom so that this float is substantially empty, water will start to flow into the tank through the hole 33, since the sealing member 34 is lifted slightly from the top end of this hole by water pressure supplied to the holes 23, 21, cavity 15, and holes 31 and 33. Water is supplied through these holes from the water supply line that is connected to the inlet 26 of the valve housing 13, and as this water accumulates in the tank structure formed by the base 10 and the cover 11 it raises the float 49. Also since the cross-sectional area of the hole 33 is substantially larger than the cross-section area of the hole 23, water from the cavity 15 drains out faster through the hole 33 then additional water is supplied into this cavity through the hole 23, thus allowing the water pressure on the seal 20 to move the valve 14 to the left, whereupon water is supplied from the inlet 26 to the outlet 25 and to the sprinklers connected to the outlet 25, so that the watering cycle is started. During the watering cycle as the water rises in the tank structure 10—11 it replaces the air in this tank structure and consequently the water can rise only as fast as the air is released from the inside of this structure. The rapidity with which the air is released from the tank structure is controlled by the slotted screw 62 which is threaded into the cup 60. The screw 62 is provided with a slot extending across the threads thereof to provide a path through which air may leak from the tank structure. This slotted screw serves to vent, in a controllable manner, the small cavity between the cup 60 and the cover 11 which cavity is connected to the inside of the cover by the hole around the lower flange of the cup, as shown in FIGURE 4. Thus by unscrewing the screw 62 the rapidity with which the air is released from the inside of the tank structure may be increased, and conversely by screwing the screw 62 in, the rapidity may be decreased. Thus the length of the watering cycle can be controlled by the setting of the screw 62.

A small hole may be provided in the tube 58 at the water level at which the float is raised enough so that the watering cycle is started. Thus air may leak out of the tank structure through this hole and the tube 58 when the tank structure is starting to fill with water, that is, before the watering cycle is started, so that water does not dribble out of the tank structure through the tube 58 before the watering cycle is started if the screw 62 is turned in so far that air does not escape freely.

When water flows through the main valve into the cavity 17, water will also flow into the cavity 17a and raise the seal 64e up against the disk-shaped member 64b, thereby sealing the hole 64i that leads to the syphon tube 63. Consequently the syphon tube 63 cannot function to drain out water accumulated in the tank structure during the watering cycle. Also the tube 66 is provided to prevent such drainage during the first part of the watering cycle.

As water flows into the tank structure through the hole 33 and the tank structure gradually becomes full, the float 49 is caused to rise until it is in the upper position of the tank structure. With the float 49 in its upper position and with the tank structure substantially full of water, some of the water flows into the float 49 through the opening 51 in its cover. As the float 49 fills it sinks to its lower position so that the top of the hole 33 is sealed by the sealing member 34, since the float lever 48 engages the top of the insert 39a and causes the bottom of this insert to press down upon the member 35 to press the seal 34 down against the top of the hole 33. When the hole 33 is closed, water pressure builds up in the cavity 15 of the main valve structure and when the pressure in this cavity is equal to the water pressure in the inlet cavity 27, the sealing member 20 is caused to engage the sealing lip of the inlet cavity 27 and water flow from the inlet cavity to the outlet 25 is stopped. This result is accomplished since the area of the end portion 14a of the valve member 14 is substantially greater than the effective cross-sectional area of the sealing member 20. When the main valve is shut off the water pressure in the cavity 17a drops because the cavities 17 and 17a are drained to the outlet 25. As the result the sealing member 64e drops away from the disk-shaped member 64b, so that the hole 64i is open.

Opening the hole 64i allows the syphon 63 to drain the water out of the tank structure. It will be noted that alongside of the syphon tube 63, there is positioned an additional tube 66 which also opens into the cavity 64a and the top end of which is substantially at the level in the bend of the syphon tube 63. The top end of this tube 66 is open so that this tube provides a means for immobilizing the syphon 63 during the first part of the tank structure filling cycle, that is this tube 66 will prevent the syphon 63 from functioning during this part of the tank structure filling operation.

When the float 49 was raised to its upper position, as previously described, the upper part of the U-shaped syphon tube 52 provided to the float 49 provides a cavity for trapping some air therein, as shown in the sectional view FIGURE 11. This air remains trapped in this syphon tube even after the float 48 descends to its lower position and until water from the well 53 is drained into the evaporation cup to a level lower than the end 52b of the syphon tube. When the water in the well 53 is lowered to this position, then the syphon tube 52 functions to syphon the water out of the float 49, as previously described.

Another form of this invention is illustrated in FIGS. 7–11 in which there is provided a tank 110 having an upper section 111 and a bottom section 112, each of said sections having flanges which are adapted to receive the machine screws 113 for the clamping thereof against a gasket 114 so that the tank sections may be held secured together in airtight fashion. The bottom tank section 112 is provided with a partition 115 whereby this section is divided into two portions for purposes which will be apparent from the description hereinafter.

Brackets 116, shown in FIGURE 7, are attached to the inner surface of the bottom section 112 and these brackets support a pin 117 which functions as a pivot for the arm 118 that is soldered, welded or otherwise attached to the side of the flat bottom cylindrical float 122. The pivoted arm 118 is provided with a resilient member 119 of rubber or the like which is attached thereto and is adapted to engage the top of the tube 120 to seal said tube when the float is in its lower position shown in solid lines in FIG. 7. This tube 120 is soldered, welded or otherwise attached to the bottom of the tank section 112 so that the hole 121 through this tank section registers with the hole through this tube.

The float 122 is provided with an opening 123 in the top thereof and this opening is of a configuration such as shown in FIG. 10. A tube 124 having a substantially U-shape extends into the float 122 near the top thereof and is fastened to the wall of this float by soldering, welding, brazing or the like. One end of this tube 124 extends well into the float 122 and almost to the bottom thereof and when the float is in its lower position the other end of this tube extends into a cup 167 as shown in FIG. 8. Another U-shaped tube 125 is adjustably supported on the partition 115 by means of the bracket 126 that is attached to this partition.

The tube 125 is adjustably supported by the bracket 126 so that the end 125a of the tube may be raised or lowered with respect to the bottom of the lower tank section 112. The end 125b of the tube 125 is adapted to be positioned in the tube 127 which is attached to the bottom of the lower tank section 112 and is soldered, welded or brazed thereto so that it opens into this lower tank section. The tube 127 is provided with a flange that is adapted to be engaged by the coupling 128 which is threaded to the upper end of the tubular member 130 so that the flange on the lower end of the tube 127 is pressed against the gasket 129 which is positioned on the upper end of the tube 130. The lower end of the tube 130 is provided with a hole 131 in which is positioned a pin 132 that extends through a sealing member 133 which is adapted to engage the surface 134 to seal the hole 131 when the sealing member 133 is brought against the surface 134 by the water pressure in the member 135.

The member 135 is in the form of a T-coupling having an inlet end 137 and an outlet end 136 which is connected to the water sprinkler system to feed water thereto. The inlet is coupled to the pipe 138 that extends laterally from the valve housing 139 which is provided with a lower threaded section 140 that is adapted to be coupled to the water supply line. The valve housing 139 is provided with a valve seat 141 that is adapted to be engaged by the sealing member 142 which is made of resilient material such as rubber, nylon and the like. The sealing member 142 is attached to the member 146 by means of the screw 143 which is provided with an axial hole 144, the bottom end of this hole being covered by a screen 145 that is attached to the screw head by solder and the like. The lower end of the hole 144 opens through the screen 145 into the water inlet cavity of the housing 139 and the upper end of this hole 144 opens into the hole 147 that extends axially through the upper portion of the member 146. This upper portion of this member is threaded into the guide member 148 which is provided with a threaded portion 152 of reduced diameter extending from the top thereof and this portion is also provided with an axial hole 158 which extends therethrough and connects with the hole 147. A packing member 149 is held against the bottom of the weight 148 by means of the threaded nut 150 which engages the threaded portion of the member 146. The upper part of the valve housing 139 is provided with a cavity 151 and the packing gasket 153 which is supported on the threaded member 152 between the washers 154 and 155 by means of the threaded nuts 156 and 157 is positioned in this cavity so that the sides of this gasket 153 engage the inner side walls of this cavity. The gasket 153 thus functions as a partition between the cavity 151 and the cavity 161a. The cavity 151 is vented to the outer atmosphere through the hole 151a that is provided near the bottom thereof. The top of the valve housing 139 is threaded to receive the threaded member 159 which is provided with a flange for clamping the flange 160 of the tube 161 to the upper surface of the gasket 160a that is positioned on the top edge of the valve housing.

A pipe 162 having a cup 162a at the top end thereof for catching rain water and feeding this water into the tube 162, is attached to the top tank section 111. The lower end of this pipe 162 extends down into the compartment formed by the partition 115 in the right-hand side of the lower tank section 112 and the purpose of this pipe will be described hereinafter. The top tank section 111 is also provided with an adjustable air valve 163 that is attached to the outside of the top of this tank section and connects to the inside cavity in the tank through the hole 164. The cap 166 of this air valve is adjustable so that the rate at which the air from the inside of the tank is allowed to flow out through the air valve 163 during filling of the tank with water during the watering cycle may be adjusted by adjusting the cap 166 which is also provided with a small hole in the top thereof as shown in FIG. 9. A scale 165 is associated with the air valve 163 and this scale may be calibrated in terms of time so that the length of the watering cycle may be determined by positioning the indicia on the cap 166 with respect to the calibrations of the scale 165 as will be described hereinafter.

A cup 167 is attached to the bottom of the lower tank section 112 and communicates with this tank section by the hole 168 so that the lower end 124a of the U-shaped tube 124 is adapted to extend into the cavity inside of the tube 167 when the float 122 is in its lower position as shown in FIG. 8. The bottom of the cup 167 is provided with a threaded hole into which the tube 169 is threaded and the bottom of this tube is closed by the cap 170. Another cup 171 that is concentric with the cup 167 is supported by the tube 169 so that a small cavity is formed between the outside of the cup 167 and the inside of the cup 171. This cavity is partially filled by a wad of cotton string or the like so that water may evaporate therethrough but to prevent water from rapidly flowing out of the tank 111 while filling. The cup 171 is adjustable with respect to the cup 167 so that the water level in inner cup 167 may be raised or lowered to control frequency of operation of device whereby the cycle of operation depending upon the weather may be controlled. A hole 167a is provided in the cup 167 to communicate between the cavity inside of the cup 167 and the cavity formed between these two cups so that water may flow into this latter cavity from the inside of the cup 167.

The operation of the embodiment of this invention shown in FIGS. 7–10 is as follows: When the float 122 is in its lower position as shown in FIG. 7 and when this float is full of water the main valve 139 is closed so that the sealing member 142 thereof is in engagement with the seating surface 141. At this time air is trapped in the U-shaped syphon tube 124 and an air bubble is in this U-shaped syphon tube as shown in FIG. 11. As long as sufficient water remains in the inner cup 167 shown in FIG. 8, the syphon tube 124 will not function to empty the water from the float 122. When the water level in the cup 167 is lowered sufficiently because of evaporation from the cavity between the cups 167 and 171 or any other means, the air bubble in the syphon tube 124 will move downward toward the cup 167 and the water from the float 122 will be emptied. When the float is substantially empty, water will start to flow into the tank through the tube 120 since the resilient pad 119 is lifted slightly from the top end of the tube 120 by water pressure supplied through the holes 144, 147 and 158 formed through the various elements of the main valve as previously described. Water is supplied through these holes from the water supply line that is connected to the threaded end 140 of the main valve housing when the pressure in the water supply line is up to normal. Water will therefore enter the cavity 161a through the holes 144, 147 and 158 and water from the cavity 161a will enter the tank section 112 through the tube 120. As this water accumulates in the bottom tank section, it raises the float 122. It will be noted that since the cross-sectional area of the hole 121 through the tube 120 is substantially larger than the cross-sectional area of the hole 158 that the water from the cavity 161a drains out faster through the hole 121 then additional water is supplied into this cavity 161a through the hole 158 thus allowing the water pressure on the lower part of the main valve to lift the seal 142 from its seat 141 so that water is supplied to the pipe 138, to the T-coupling 135 and to the water pipe connected to the end 136 of the coupling whereby the watering cycle is started.

If another set of water sprinklers that is connected to the same water supply line is turned on at the time that the float 122 is emptied, the pressure in the tube 120 is insufficient to permit water to dribble into the tank past the sealing member 119 so as to raise the float 122 until the other set of sprinklers is shut and normal pressure is restored at the main valve.

During the watering cycle, as the water rises in the tank 110, it replaces the air in the tank and consequently the water can rise only as fast as the air is released from the inside of this tank since the excess water is forced out of the tank 110 through the tube 162. This air release is controlled by the air valve 163 and the rapidity with which air is allowed to escape from the tank through the opening 164 may be controlled by the cap 166. Consequently the length of the watering cycle can be controlled by setting the cap 166 which controls the air release from the inside of the tank 110. The position of the cap 166 may be adjusted beforehand in accordance with the calibrations on the dial 165 so that the lengths of the watering cycle may be predetermined.

When water flows through the main valve 139 into the pipe 138 and the T-coupling 135 the water pressure causes the sealing member 133 to engage the surface 134 of the lower end of the pipe 130 and as a result the hole 131 is sealed so that water is prevented from flowing into the tank 110 through the tube 127. Consequently, the syphon tube 125 cannot function to drain water accumulated in the lower section of the tank 112 during the watering cycle.

As water flows into the tank 110 through the tube 120 and this tank gradually becomes full, the float 122 is caused to rise until it is in the upper position shown in dotted outline in FIGURE 7. With the float 122 in its upper position and with the tank 110 substantially full of water, some of the water flows into the float 122 through the opening 123. As the float 122 fills it sinks to its lower position so that the top of the tube 120 is sealed by the sealing member 119. When the tube 120 is closed at the top thereof pressure builds up in the cavity 161a in the upper part of the main valve and when this pressure is equal to the waterpressure in the inlet 140 the sealing member 142 is caused to engage the sealing surface 141 to thereby stop the flow of water through the main valve into the T-coupling 135. This result is accomplished since the area of the piston in the chamber 161a is larger than the area of the valve seal 142. Closing the main valve shuts off the flow of water into the T-coupling 135 with the result that the hole 131 is opened since the sealing member 133 is allowed to drop away from the sealing surface 134.

Opening the hole 131 allows the syphon 125 to drain the water out of the tank 110 to a level corresponding to the lower end of the tube 125a on the left-hand side of the partition 115. The level on this side of the partition may be adjusted by adjusting the depth of the end 125a of this tube so that a certain amount of liquid remains under and around the lower part of the float 122. This level is different for different normal water pressures in the supply line, that is, at lower supply line pressures a higher level is desired and vice versa. The water on the righthand side of the partition 115 is of course drained completely through the tube 127.

When the float 122 was raised to its upper position, the upper part of the U-shaped syphon tube 124 provides a cavity for trapping a small amount of air as shown in the sectional view FIG. 11. This air is trapped in this syphon tube even in the lower position of the float 122 until water from the space between the cups 167 and 171 evaporates and thereby permits the syphon tube 124 to syphon the water out of the float 122 into the cup 167.

The cup 162a functions to catch rain during rainy weather and the rain water is fed through the tube 162 into the cups 167 and 171 to replace water evaporated therefrom and thereby delay this apparatus from turning on the sprinklers. A small plug 110a is provided in the bottom of the tank 110 for the purpose of draining this tank when it is desired not to have it in operation. A small screw 110b is provided in the plug 110a to lift the float 122 a slight amount when it is desired to let water dribble into the tank to resume operation after the plug 110a has been tightened and sealed.

While I have shown a preferred embodiment of the invention it will be understood that the invention is capable of variation and modification from the form shown so that its scope should be limited only by the scope of the claims appended hereto.

I claim:

1. In a sprinkler control system having a valve controlling the water supply to a sprinkler during the sprinkling cycle, a casing, a syphon float in said casing, means including a pivoted lever for pivotally mounting said syphon float in said casing, water evaporation means having a surface exposed to the atmosphere, means controlled by said lever controlling said valve, said syphon float having an opening in the top thereof for receiving water so that said syphon float is tilted on the pivot of said lever when said syphon float is filled a predetermined amount, said lever operating said last mentioned means to close said valve when said syphon float is tilted to its lower position, said syphon float having a syphon with one end in said float and means connected its other end to said evaporation means so that it syphons the water out of said float into said evaporation means when said syphon float is tilted to its lowered position, said evaporation means having means for controlling the time at which syphoning of the water from said syphon float begins in accordance with evaporation from said evaporation means.

2. In a sprinkler control system as set forth in claim 1, further characterized in that said means connected to said lever comprises a pilot valve connected to control said valve.

3. In a sprinkler control system as set forth in claim 2, further comprising means in said pilot valve for feeding water into said casing until said syphon float is tilted on the pivot of said lever to its lower position and the sprinkling cycle is stopped.

4. In a sprinkler control system as set forth in claim 3, further characterized in that said casing is provided with means for emptying the water therefrom when the sprinkling cycle is stopped.

5. In a sprinkler control system as set forth in claim 4, further characterized in that said means for emptying the water from said casing comprises a syphon in said casing and a check valve for connecting said last mentioned syphon to a sprinkler.

6. In a sprinkler control system as set forth in claim 2, further characterized in that said evaporation means comprises a cup opening into said casing and a cup positioned outside of said first-mentioned cup and a hydraulic connection between said cups and the syphon of said syphon float being positioned to syphon water from said syphon float into the cup in said casing when said syphon float is tilted to its lower position.

7. In a sprinkler control system as set forth in claim 6, further characterized in that said hydraulic connection is provided with means to control the flow of water between said cups to control the rate of syphoning of the water from said syphon float.

8. In a sprinkler control system having a sprinkler control valve and means connecting sprinklers thereto, said valve being connected to a water pressure line, a casing, a float in said casing, a pivoted arm attaching said float to said casing, said valve having a control cavity and a tube connecting said cavity to said casing, said tube opening into said casing for supplying water from said valve into said casing, control means controlled by said pivoted arm admitting water through said tube into said casing when said float is substantially empty whereby the pressure in said control cavity is reduced and said valve is permitted to open to supply water to the sprinklers to start the watering cycle, the water entering said casing serving to lift said float, adjustable means for releasing the air from said casing to control the flow of water into said casing through said tube and to control the duration of the watering cycle, said float having an opening in the top thereof through which water flows into said float when the water level in said casing reaches over said opening whereby said float is caused to sink and said pivoted arm causes said control means to interrupt water flow into said casing through said tube, water evaporation means having a surface open to the atmosphere, and means connected to said float for draining the water therefrom into said water evaporation means when said float is in its lower position.

9. In a sprinkler control system as set forth in claim 8, further characterized in that the adjustable means for releasing air from said casing comprises an air release valve postioned in the top part of said casing to control the time required to fill said casing with water.

10. In a sprinkler control system as set forth in claim 8, further characterized in that the water evaporation means includes a cup connected to said casing and the means connected to the float for draining water therefrom includes a syphon tube attached to said float and having an end that is adapted to be received by said cup when said float sinks to its lower position, said syphon tube being shaped to trap a bubble of air therein when said float is in its raised position and said bubble of air being adapted to control the draining of water from said float to said cup.

11. In a sprinkler control system as set forth in claim 8, further characterized in that said casing includes a bottom section having a partition for dividing it into two parts, one of said parts being adapted to receive the lower part of said float and means for draining all but a predetermined amount of water from said one part after the watering cycle whereby a predetermined buoyance is provided to said float when it is in its lower position.

12. In a sprinkler control system as set forth in claim 11, further characterized in that the means for draining said one part comprises a syphon that is adapted to be adjusted so that a predetermined amount of water is left in said one part and means for preventing said syphon from draining said casing during the watering cycle.

References Cited in the file of this patent

UNITED STATES PATENTS

| | | |
|---|---|---|
| 1,992,877 | Montham | Feb. 26, 1935 |
| 2,004,194 | Lacy-Mulholl | June 11, 1935 |
| 2,577,337 | Lancaster | Dec. 4, 1951 |
| 2,619,105 | Hanser | Nov. 25, 1952 |
| 2,878,824 | Wsanson | Mar. 24, 1959 |
| 2,895,493 | Edwards | July 21, 1959 |